Oct. 21, 1924.

H. L. BECHER 1,512,012

AUTOMOBILE ROOF

Filed Dec. 9, 1922

WITNESS
G. V. Rasmussen

INVENTOR
HUBERT L. BECHER
BY
Briesen Schreuk
ATTORNEYS

Patented Oct. 21, 1924.

1,512,012

UNITED STATES PATENT OFFICE.

HUBERT LEOPOLD BECHER, OF TRENTON, NEW JERSEY, ASSIGNOR TO THE AGASOTE MILLBOARD CO., OF TRENTON, NEW JERSEY, A CORPORATION OF NEW JERSEY.

AUTOMOBILE ROOF.

Application filed December 9, 1922. Serial No. 605,763.

*To all whom it may concern:*

Be it known that I, HUBERT L. BECHER, a citizen of the United States, and resident of Trenton, county of Mercer, State of New Jersey, have invented certain new and useful Improvements in Automobile Roofs, of which the following is a specification.

My invention relates to roofs and more particularly to solid roofs for automobiles of the closed car type and other equivalent automotive or other vehicles. Experience has shown that solid roofs of the character referred to create an objectionable condition in the interior of the vehicles of which they comprise a part when said vehicles are in motion; this condition is commonly referred to as rumbling and is particularly distressing and uncomfortable to the occupants in small vehicles such as coupés although the condition is objectionable also in the larger vehicles such as sedans and the like. The cause of the so-called rumbling and its actual character are not definitely known although it is well recognized that a condition uncomfortable to the occupants of closed cars is created in the causing of which the solid roof plays a major part. The object of the present invention is to provide a roof for automobiles of the closed car type, and similar vehicles, which belongs to the solid roof class and possesses the merits and advantages thereof and which obviates the creation of the objectionable conditions referred to. The invention will be fully described hereinafter.

Figure 1:
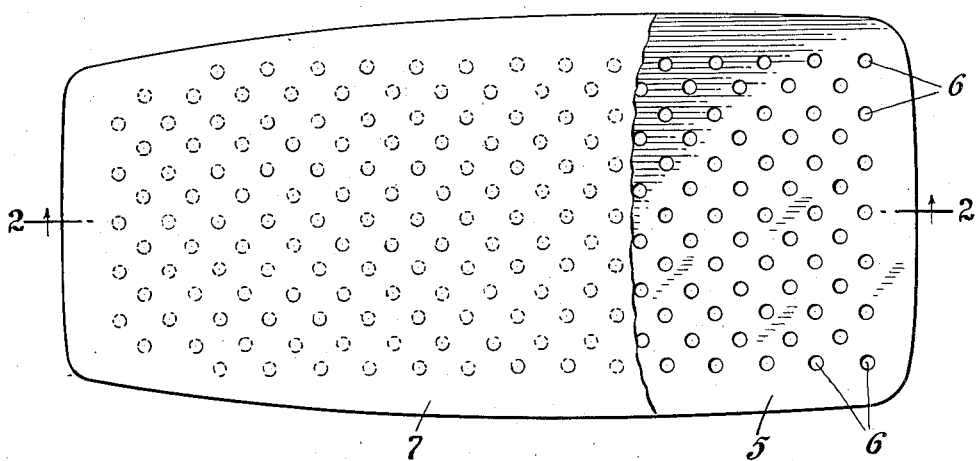
Figure 2:
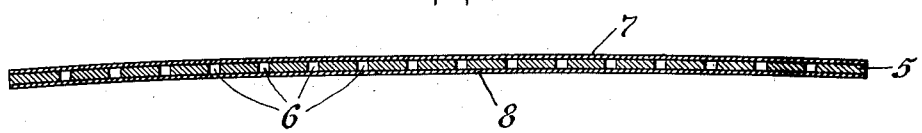

In the accompanying drawings, which illustrate an example of the invention without defining its limits, Fig. 1 is a plan view of the improved roof with parts broken and Fig. 2 is a section thereof on the line 2—2 of Fig. 1.

The roof comprises a solid body 5 which may be made of any suitable material such as, for instance, heavy pulp board. This body 5 is provided with apertures 6 located at intervals throughout the same and extending completely therethrough as shown in Fig. 2; the apertures 6 may be located at regular intervals along parallel lines in registry with each other or the apertures along one line may be staggered with respect to those of adjacent lines; in some cases it may be desirable to arrange said apertures in groups at predetermined areas of said body. In the preferred construction the apertures 6 are located within a predetermined zone and do not, for instance extend to those portions of the body which are intended to lie adjacent to the roof rail of the vehicle, for the reason that at these points the greatest gluing strength and area are required. The body 5 is provided upon its upper surface with a fabric or other suitable covering material 7 which may be secured in surface contact with the body in any convenient manner as by gluing. This covering material 7 completely conceals the apertures 6 from view from the outside of the vehicle and at the same time seals said apertures against the entrance of water, snow and the like from the outside. The covering 7 is applied to the body 5 in such a manner that it will be under a tension and consequently will not tend to sink into the apertures 6 at such points where the latter are located. A suitable fabric 8 may similarly be applied to the lower surface of the roof.

The roof may be finished in any conventional manner and is attached in place upon the vehicle in any well known way. It has been found that a roof constructed in the manner illustrated and described has the advantages of a solid roof and does away with that objectionable condition in the interior of the vehicle which is referred to as rumbling; this is true of the smallest closed vehicles such as coupés as well as the larger type thereof such as sedans.

I claim:

1. A roof for closed vehicles and the like comprising a solid body of pulp board provided with perforations located at spaced intervals and covering material secured in surface engagement with the opposite surfaces of said body and completely concealing said apertures, substantially as and for the purpose described.

2. A roof for closed vehicles and the like comprising a solid board body provided with perforations located at spaced intervals and a covering material secured in surface engagement with the outer surface of said body under tension to completely conceal said perforations from the outside.

In testimony whereof I have hereunto set my hand.

HUBERT LEOPOLD BECHER.